US012694200B2

(12) United States Patent
Frattura et al.

(10) Patent No.: US 12,694,200 B2
(45) Date of Patent: Jul. 28, 2026

(54) BUSINESS INTENT BASED COMMUNICATIONS ENHANCEMENT

(71) Applicant: Dell Products L.P., Round Rock, TX (US)

(72) Inventors: David Edward Frattura, Stamford, CT (US); Stephen James Todd, North Andover, MA (US); Eloy Francisco Macha, Crowley, TX (US); Robert Anthony Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 18/162,224

(22) Filed: Jan. 31, 2023

(65) Prior Publication Data

US 2024/0256761 A1     Aug. 1, 2024

(51) Int. Cl.
*G06F 17/00* (2019.01)
*G06F 16/332* (2019.01)
(Continued)

(52) U.S. Cl.
CPC ........ *G06F 40/166* (2020.01); *G06F 16/3322* (2019.01); *G06Q 10/107* (2013.01);
(Continued)

(58) Field of Classification Search
CPC ........... G06Q 30/0255; G06Q 30/0269; G06Q 10/067; G06Q 10/00; G06Q 10/107;
(Continued)

(56) References Cited

U.S. PATENT DOCUMENTS 7,512,612 B1     3/2009 Akella et al.
7,805,440 B2     9/2010 Farrell et al.
(Continued)

FOREIGN PATENT DOCUMENTS

WO     2019089482 A1     5/2019

OTHER PUBLICATIONS

Totet, Matthieu, K-partite and Bipartite Graph (Multimode Networks Transformations), pp. 1-8, 2021.
(Continued)

*Primary Examiner* — Michael Ortiz-Sanchez
(74) *Attorney, Agent, or Firm* — Chamberlain, Hrdlicka, White, Williams & Aughtry; Aly Z. Dossa

(57) ABSTRACT

A method and system for business intent based communications enhancement. In pursuing the achievement of their respective responsibilities, employees or users, affiliated with an organization, often tend to employ a variety of software productivity tools—a subset of which may be directed to facilitating communications between said employees amongst themselves internally, as well as other individuals outside the organization. Concerning communications between any given employee and another employee or an outside individual, a perceived value of (and thus, a likelihood of a positive response to) the message, composed by the employee, is usually limited to a level of business acumen associated with, as well as the skill and/or talent of, said employee. Embodiments disclosed herein, accordingly, leverage a number of factors (including user business intent) in order to enhance employee-composed messages through the proposition of value-supplementing edits.

15 Claims, 11 Drawing Sheets

(51) Int. Cl.

| | |
|---|---|
| *G06F 17/27* | (2006.01) |
| *G06F 40/166* | (2020.01) |
| *G06Q 10/107* | (2023.01) |
| G06F 16/2457 | (2019.01) |
| G06F 16/483 | (2019.01) |
| G06F 40/174 | (2020.01) |

(52) U.S. Cl.
CPC ........ *G06F 16/2457* (2019.01); *G06F 16/483* (2019.01); *G06F 40/174* (2020.01)

(58) Field of Classification Search
CPC ...... G06F 40/30; G06F 16/3329; G06F 16/00; G06F 9/453; G06F 40/279; G06F 16/3344; G06F 40/166; G06F 16/3322; G06F 16/9538; G06F 16/438; G06F 16/90324; G06F 40/174; G06F 16/332; G06F 16/3338; G06F 16/532; G06F 16/583; G06F 16/68; G06F 16/78; G06F 16/3326; G06F 2111/16; G06F 9/451; G06F 3/0482; G06F 8/34; G06F 16/9535; G06F 8/60; G06F 16/252; G06F 8/38; G06F 16/90332; G06F 40/10; G06F 40/00; G06F 40/20; H04L 67/306; H04L 67/10; H04L 41/22; G06N 20/00; G06N 3/048; G06N 5/04
See application file for complete search history.

(56) References Cited

U.S. PATENT DOCUMENTS

| | | | |
|---|---|---|---|
| 10,958,694 | B2 | 3/2021 | Sandholm et al. |
| 11,232,383 | B1 | 1/2022 | Burns, Sr. et al. |
| 11,947,598 | B2 | 4/2024 | Zhou et al. |
| 2005/0038533 | A1 | 2/2005 | Farrell et al. |
| 2007/0150480 | A1 | 6/2007 | Hwang et al. |
| 2009/0138430 | A1 | 5/2009 | Nambiar et al. |
| 2012/0096002 | A1 | 4/2012 | Sheehan et al. |
| 2014/0223467 | A1 | 8/2014 | Hayton et al. |
| 2015/0104765 | A1 | 4/2015 | Towle et al. |
| 2015/0206055 | A1 | 7/2015 | Sengupta et al. |
| 2015/0256491 | A1* | 9/2015 | Eatough ............... G06Q 10/107 709/206 |
| 2015/0356431 | A1 | 12/2015 | Saxena et al. |
| 2016/0092404 | A1* | 3/2016 | Farouki ................... G06F 9/451 715/202 |
| 2016/0148327 | A1* | 5/2016 | Buchholz ............ G06Q 50/184 705/310 |
| 2016/0269328 | A1* | 9/2016 | Pola ........................ G06Q 50/01 |
| 2016/0373456 | A1* | 12/2016 | Vermeulen .......... G06F 16/3322 |
| 2017/0220535 | A1 | 8/2017 | Olsen et al. |
| 2017/0316098 | A1 | 11/2017 | Meyerzon et al. |
| 2017/0371881 | A1 | 12/2017 | Reynolds et al. |
| 2018/0218042 | A1 | 8/2018 | Krishnan et al. |
| 2018/0324976 | A1 | 11/2018 | Gao et al. |
| 2019/0050874 | A1 | 2/2019 | Matlick et al. |
| 2019/0340945 | A1 | 11/2019 | Malhotra |
| 2020/0019822 | A1 | 1/2020 | Kothandaraman et al. |
| 2020/0210383 | A1 | 7/2020 | Demaris et al. |
| 2020/0382586 | A1 | 12/2020 | Badawy et al. |
| 2020/0401638 | A1* | 12/2020 | Galimovich ...... G06F 16/90324 |
| 2021/0133287 | A1* | 5/2021 | Ayloo ................... G06F 40/274 |
| 2021/0304044 | A1 | 9/2021 | Nagarajan et al. |
| 2021/0342125 | A1 | 11/2021 | Burnett |
| 2022/0188698 | A1 | 6/2022 | Halecky et al. |
| 2022/0361376 | A1 | 11/2022 | Gao |
| 2023/0334073 | A1* | 10/2023 | Constantin ............ G06F 40/274 |
| 2023/0353651 | A1 | 11/2023 | Maurer et al. |
| 2023/0376496 | A1 | 11/2023 | Jacob et al. |
| 2024/0138106 | A1 | 4/2024 | Duncan et al. |

OTHER PUBLICATIONS

J. Leung, Examining the Characteristics of Practical Knowledge From Four Public Facebook Communities of Practice in Instructional Design and Technology, 90669-90689, 2022 (21 pages).

* cited by examiner

Example Uni-Partite Connected Graph 220

Node Set A 222
(e.g., Documents)

N0
N1
N2
N3
N4
N5
N6
N7
N8
N9

Example Bi-Partite Connected Graph 230

Node Set A 232
(*e.g.*, Documents)

N0
N2
N4
N7
N8
N9

Node Set B 234
(*e.g.*, Authors)

N1
N3
N5
N6

Example Multi-Partite Connected Graph 240

Node Set A 242
(e.g., Documents)

N3
N4
N6
N7
N9

Node Set B 244
(e.g., Authors)

N0
N2
N5

Node Set C 246
(e.g., Topics)

N1
N8

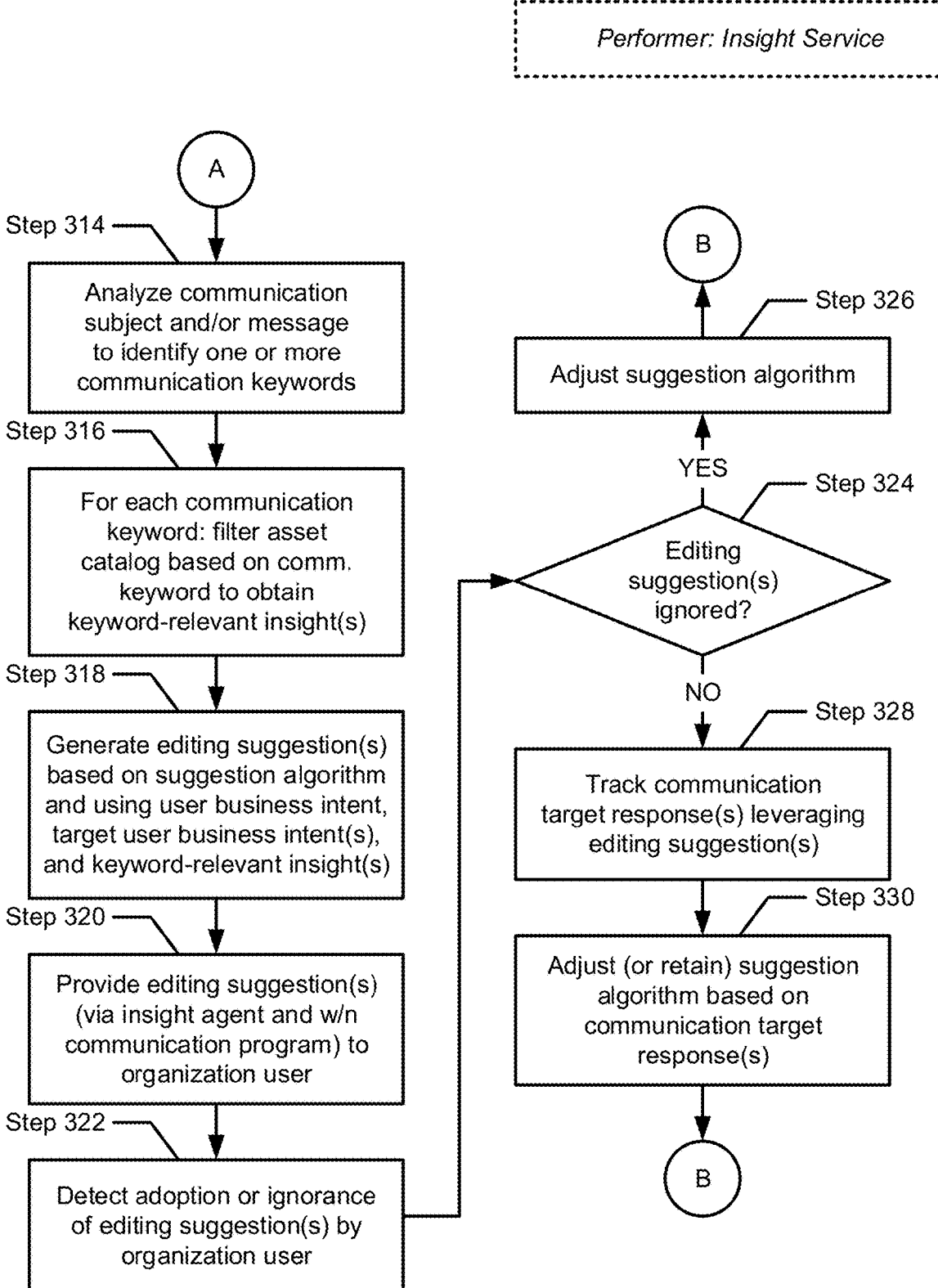

Performer: Insight Service

Step 314

Analyze communication subject and/or message to identify one or more communication keywords Step 316

For each communication keyword: filter asset catalog based on comm. keyword to obtain keyword-relevant insight(s)

Step 318

Generate editing suggestion(s) based on suggestion algorithm and using user business intent, target user business intent(s), and keyword-relevant insight(s)

Step 320

Provide editing suggestion(s) (via insight agent and w/n communication program) to organization user Step 322

Detect adoption or ignorance of editing suggestion(s) by organization user

Step 326

Adjust suggestion algorithm

YES

Step 324

Editing suggestion(s) ignored?

NO

Step 328

Track communication target response(s) leveraging editing suggestion(s)

Step 330

Adjust (or retain) suggestion algorithm based on communication target response(s)

BUSINESS INTENT BASED COMMUNICATIONS ENHANCEMENT

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for enhancing communications. The method includes: detecting an initiation, by an organization user, of a communication program; obtaining a user business intent for the organization user; monitoring interactions, by the organization user, with the communication program to identify an engagement action, wherein the engagement action reflects a composing of a communication message; generating, to enhance the communication message, a set of editing suggestions based at least on the user business intent; and providing, through the communication program, the set of editing suggestions to the organization user.

In general, in one aspect, embodiments disclosed herein relate to a non-transitory computer readable medium (CRM). The non-transitory CRM includes computer readable program code, which when executed by a computer processor, enables the computer processor to perform a method for enhancing communications. The method includes: detecting an initiation, by an organization user, of a communication program; obtaining a user business intent for the organization user; monitoring interactions, by the organization user, with the communication program to identify an engagement action, wherein the engagement action reflects a composing of a communication message; generating, to enhance the communication message, a set of editing suggestions based at least on the user business intent; and providing, through the communication program, the set of editing suggestions to the organization user.

In general, in one aspect, embodiments disclosed herein relate to a system. The system includes: a client device; and an insight service operatively connected to the client device, and including a computer processor configured to perform a method for enhancing communications. The method includes: detecting an initiation, by an organization user operating the client device, of a communication program executing on the client device; obtaining a user business intent for the organization user; monitoring interactions, by the organization user, with the communication program to identify an engagement action, wherein the engagement action reflects a composing of a communication message; generating, to enhance the communication message, a set of editing suggestions based at least on the user business intent; and providing, through the communication program, the set of editing suggestions to the organization user.

Other aspects disclosed herein will be apparent from the following description and the appended claims.

BRIEF DESCRIPTION OF DRAWINGS

FIGS. 3A and 3B show flowcharts describing a method for business intent based communications enhancement in accordance with one or more embodiments disclosed herein.

DETAILED DESCRIPTION

Figure 1A:
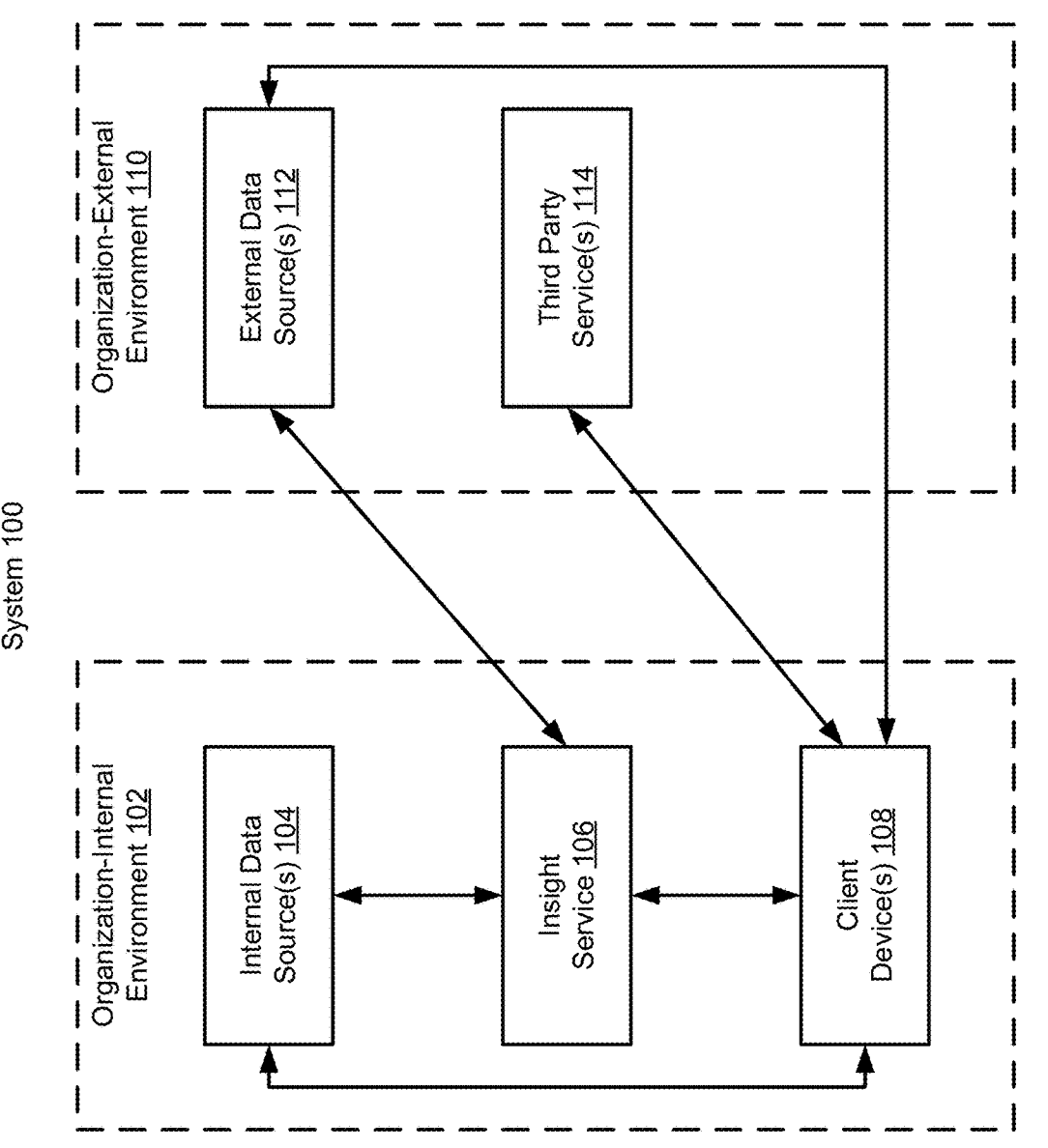
FIG. 1A shows a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5B, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to business intent based communications enhancement. In pursuing the achievement of their respective responsibilities, employees or users, affiliated with an organization, often tend to employ a variety of software productivity tools—a subset of which may be directed to facilitating communications between said employees amongst themselves internally, as well as other individuals outside the organization. Concerning communications between any given employee and another employee or an outside individual, a perceived value of (and thus, a likelihood of a positive response to) the message, composed by the employee, is usually limited to a level of business acumen associated with, as well as the skill and/or talent of, said employee. Embodiments disclosed herein, accordingly, leverage a number of factors (including user business intent) in order to enhance employee-composed messages through the proposition of value-supplementing edits.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: business intent based communications enhancement, as described in FIGS. 3A and 3B as well as exemplified in FIGS. 5A and 5B, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
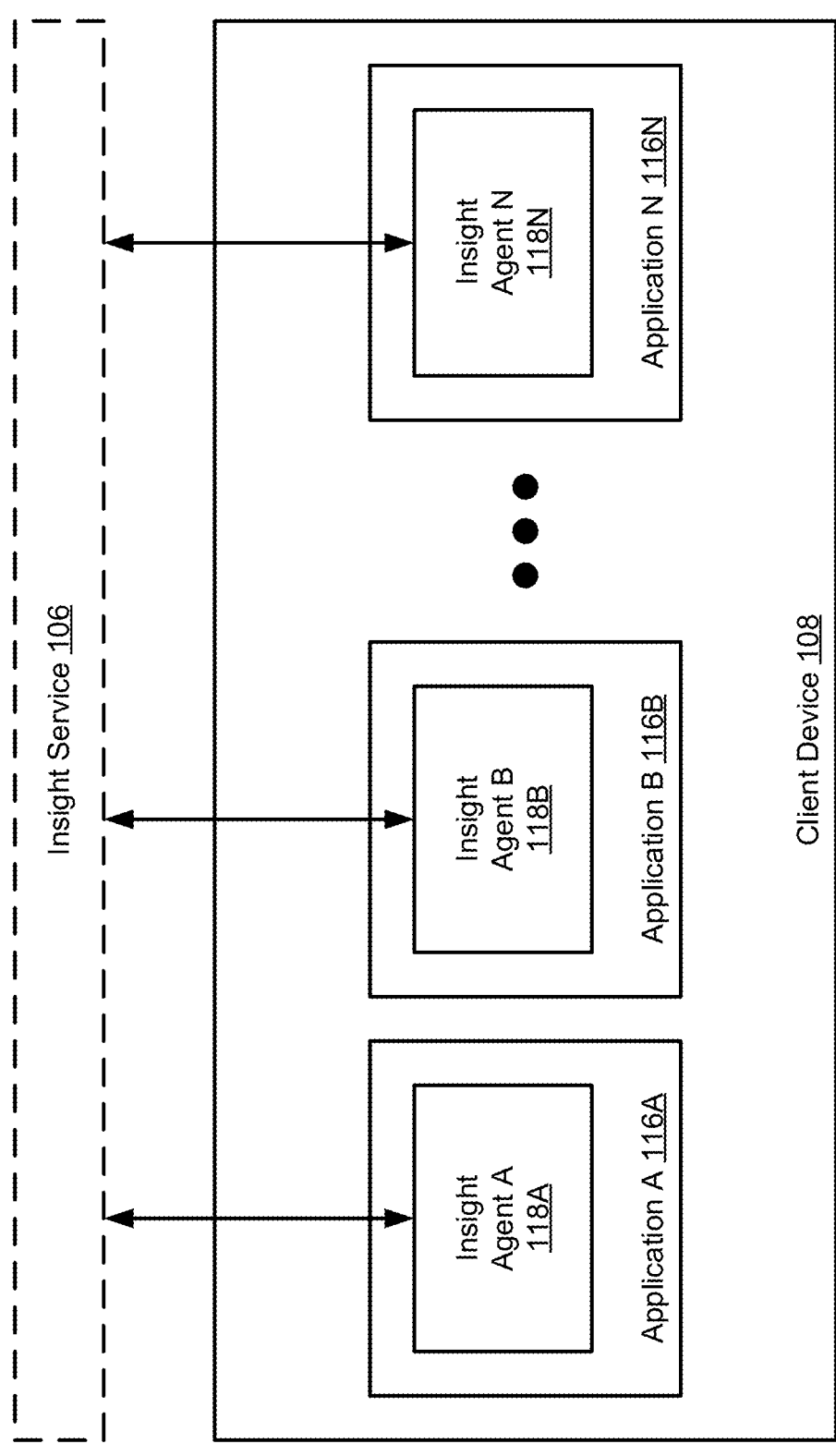
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
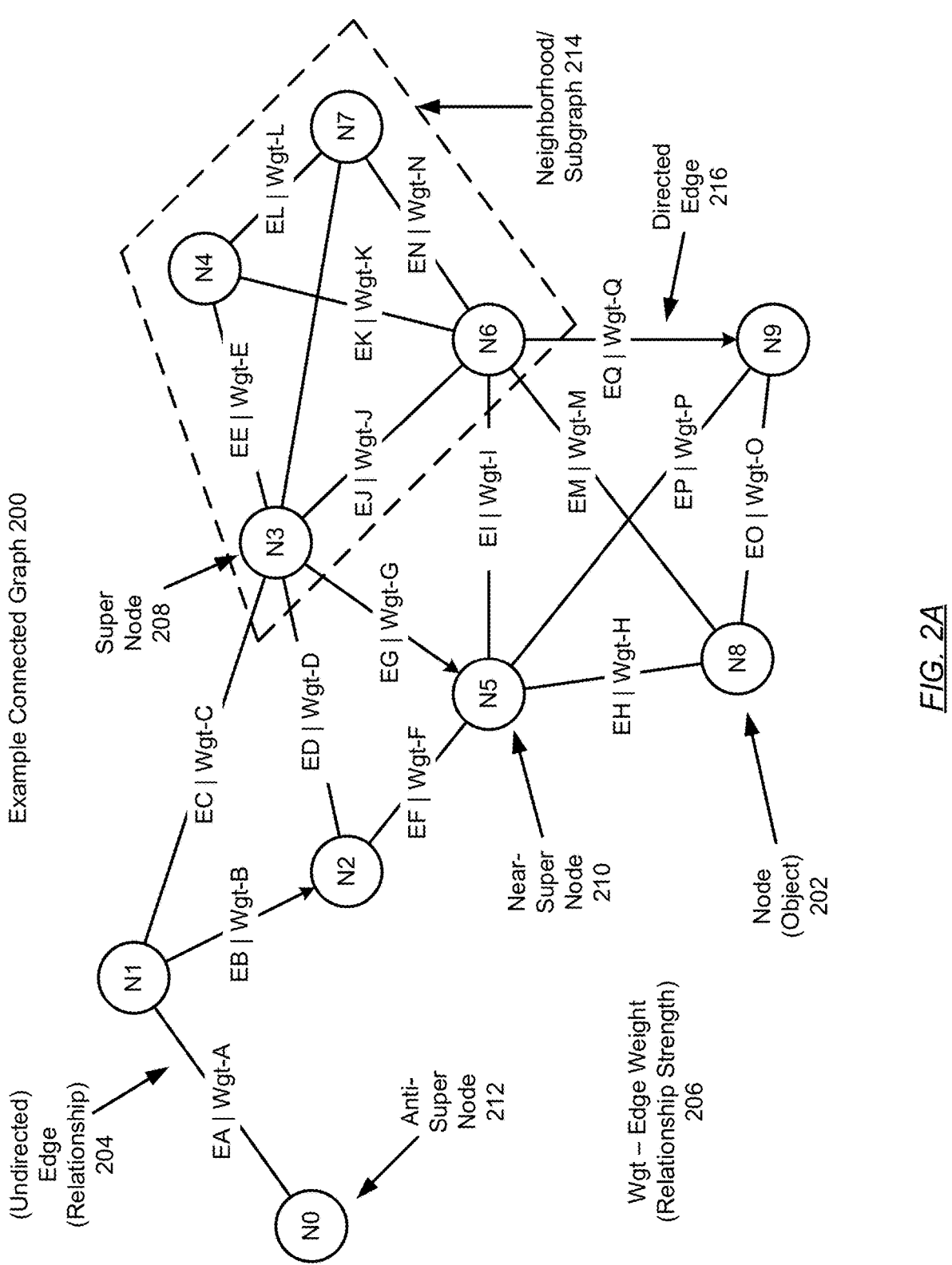
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
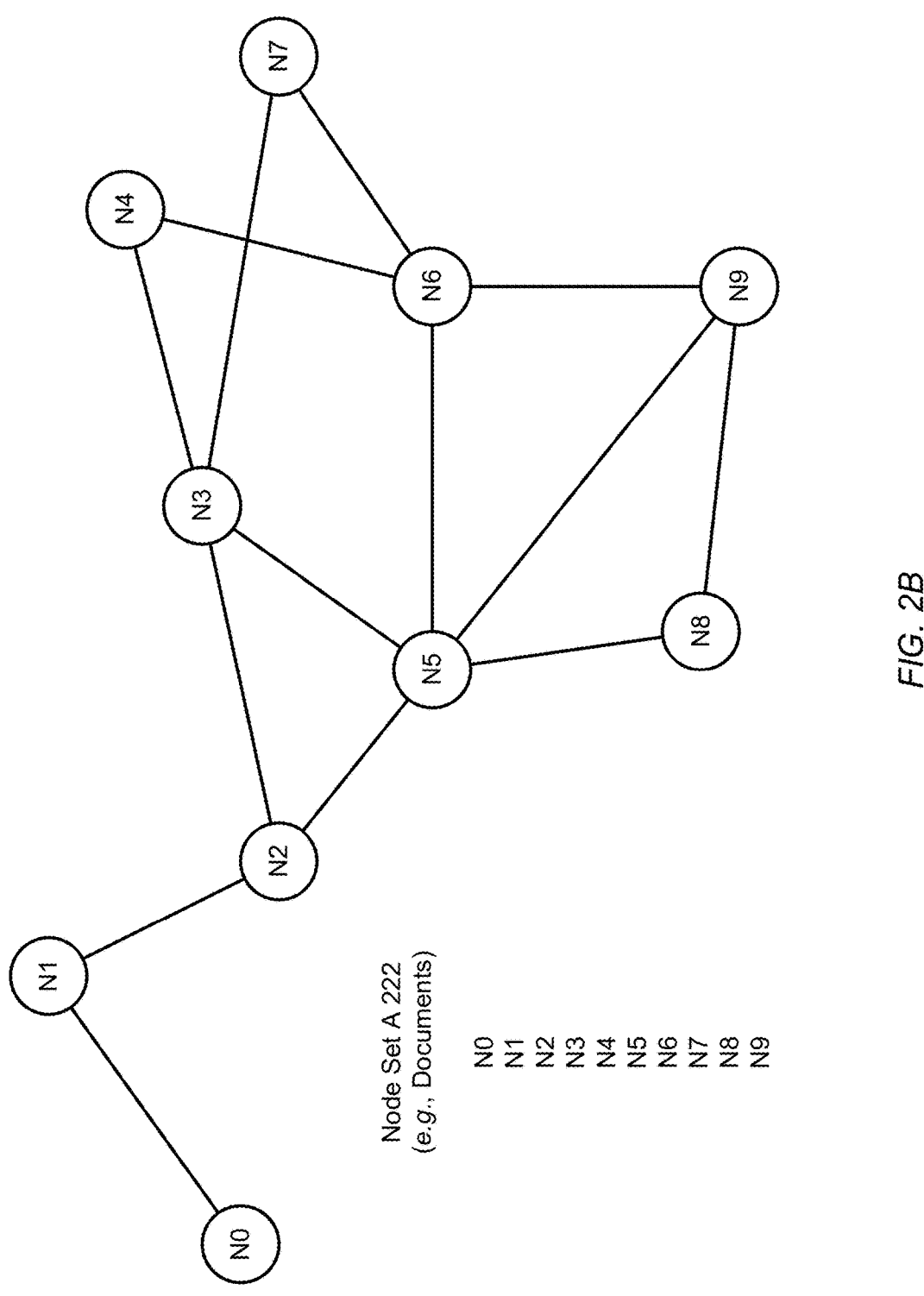
FIGS. 2B-2D show example k-partite connected graphs in accordance with one or more embodiments disclosed herein.
Figure 2C:
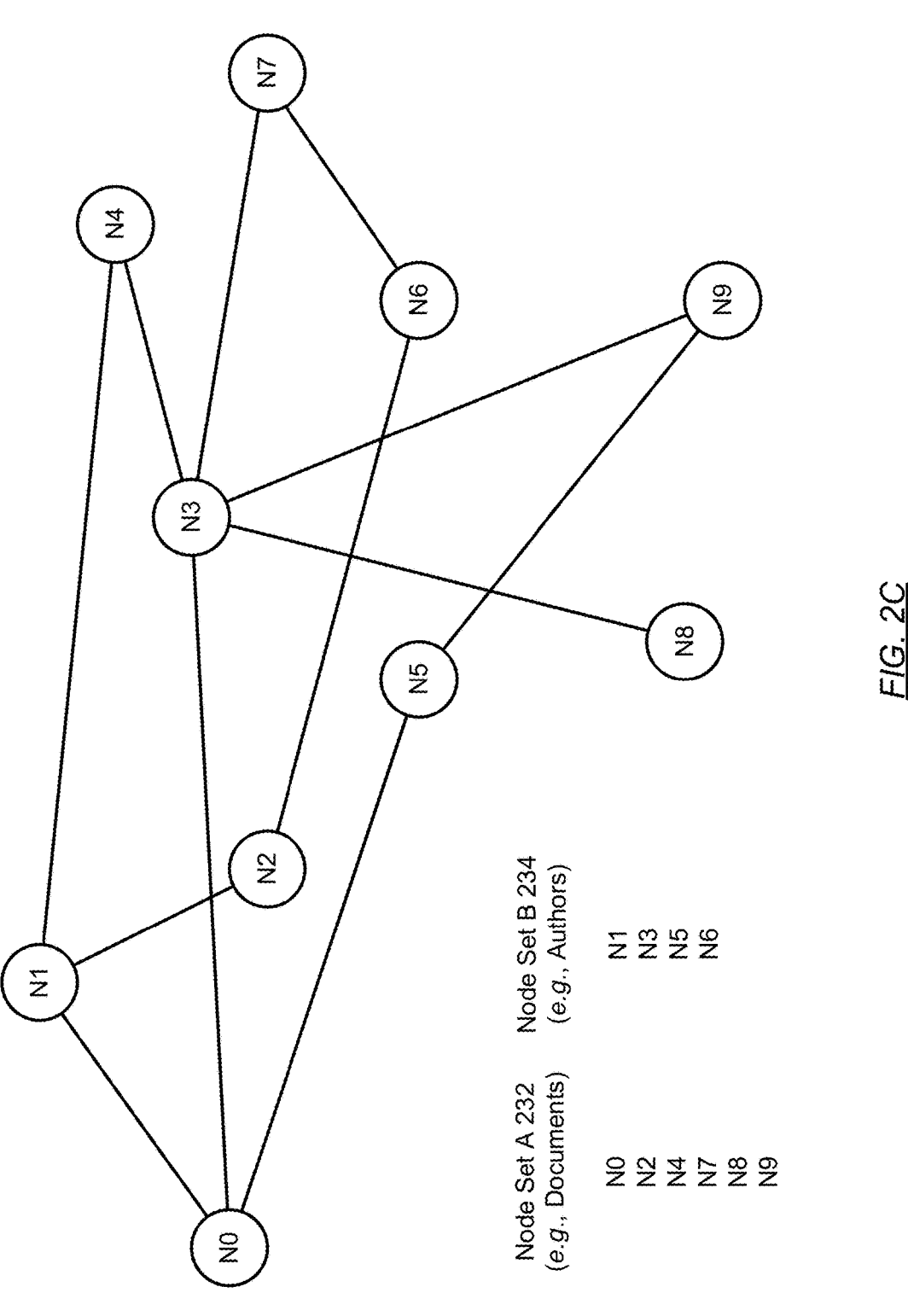
Figure 2D:
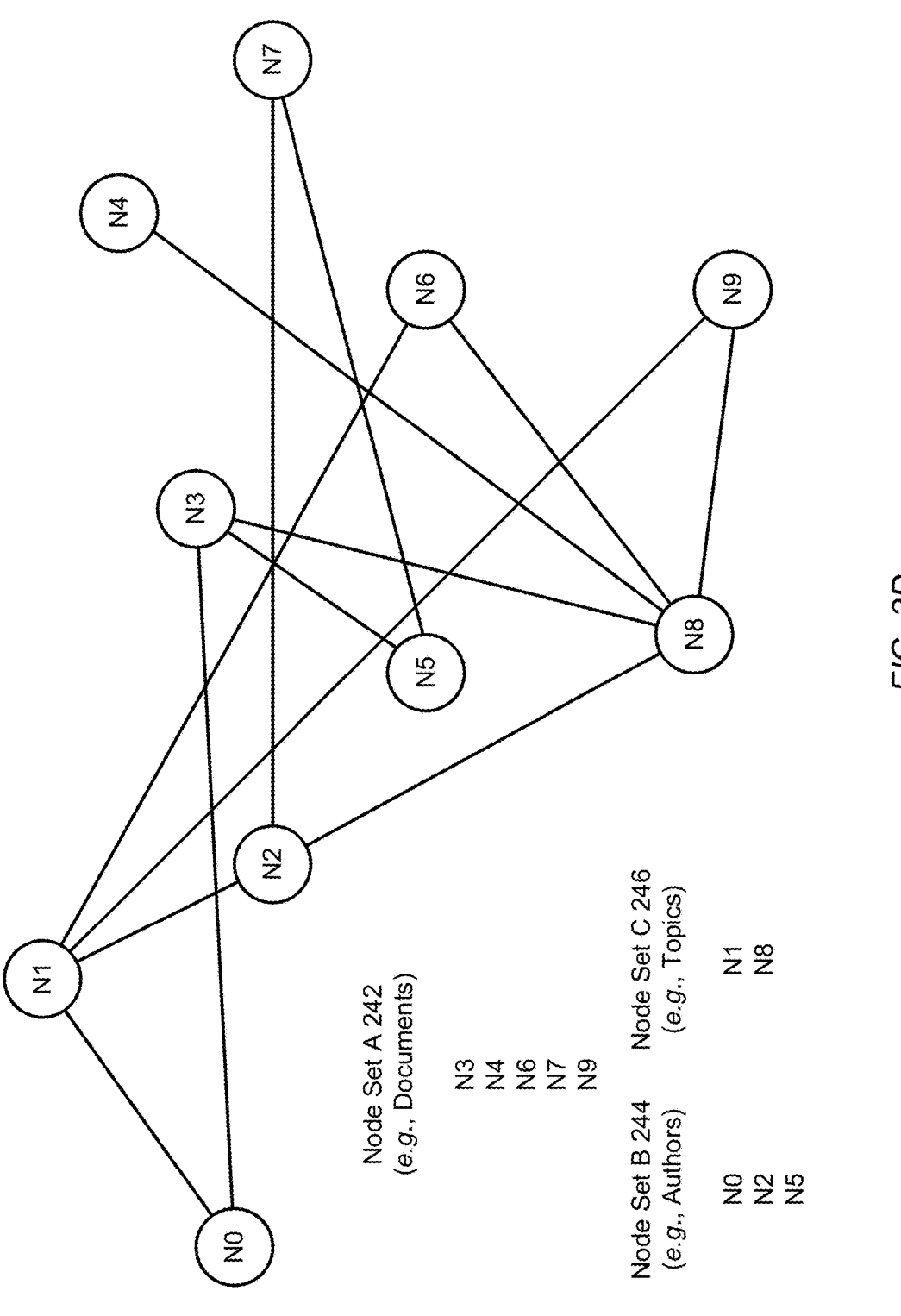

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3A:
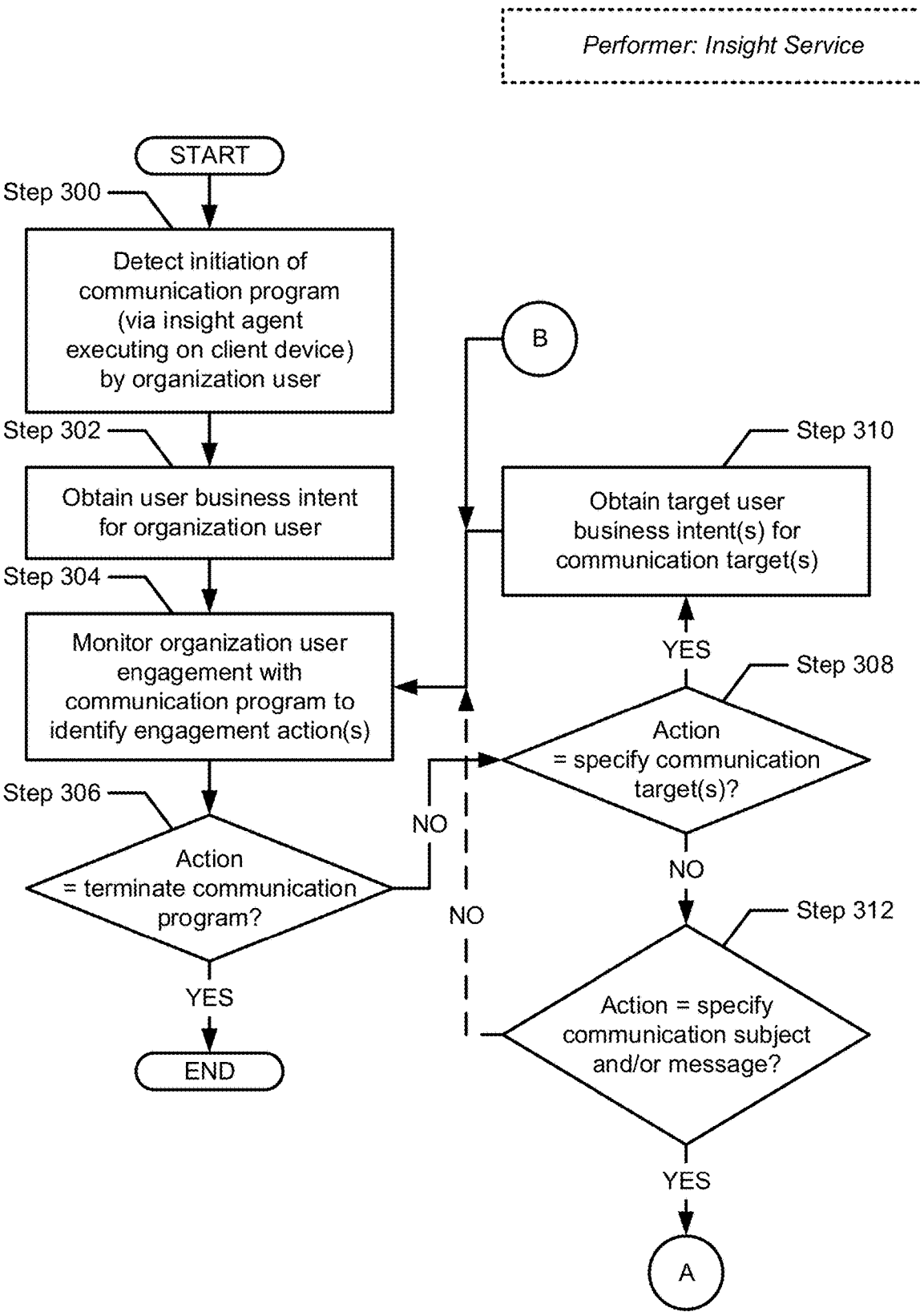

FIGS. 3A and 3B show flowcharts describing a method for business intent based communications enhancement in accordance with one or more embodiments disclosed herein. The various steps outlined below may be performed by an insight service (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, an initiation of a communication program, by an organization user, is detected. In one or many embodiment(s) disclosed herein, the communication program may refer to any software application configured to facilitate text-based communications between parties. Examples of the communication program (or forms thereof) may include, but are not limited to, an electronic mail (or email) client, a collaboration platform client, an instant messaging (IM) client, and a short messaging service (SMS) client. Further, detection of the initiation of the communication program may, for example, involve the receiving of telemetry from one or more insight agents (see e.g., FIG. 1B) executing on a client device operated by the organization user, where the communication program also executes on the aforementioned client device. The insight agent(s), accordingly, may be embedded within, or may otherwise be associated with, the communication program.

In Step 302, a user business intent is obtained. In one or many embodiment(s) disclosed herein, the user business intent may pertain to the organization user whom initiated the communication program (detected in Step 300). Further, the user business intent may refer to information, respective to the organization user, which may pertain to or describe the engagement of the organization user within and/or outside their organization (e.g., a commercial business, an education institute, etc.). The user business intent, further, may be represented through a set of business intent parameters. Examples of said business intent parameter(s) (as they pertain to any given organization user) may include, but is/are not limited to: one or more user organization roles (e.g., title(s) and/or position(s)) within an organization that may be associated with the given organization user; one or more other organization users within the organization with which the given organization user interacts and/or had interacted; one or more suppliers, distributors, customers, collaborators, and/or other actors outside the organization (also collectively referred to herein as one or more value networks) with which the given organization user interacts and/or had interacted; a search query history reflecting one or more past search queries, as well as the search topic(s) entailed, which had been previously submitted by the given organization user; one or more organization departments of the organization with which the given organization user is associated; one or more organization responsibilities (e.g., assigned project(s) or task(s)) within the organization that the given organization user is currently undertaking or had undertaken in the past; and one or more success metrics indicating a level of success that the aforementioned organization responsibility/responsibilities have brought to the organization. Said business intent parameter(s) is/are not limited to the aforementioned specific examples.

In Step 304, engagement with the communication program is monitored. In one or many embodiment(s) disclosed herein, said engagement may be performed by the organization user whom initiated the communication program (detected in Step 300) and may refer to any number of engagement actions through which the organization user interacts with, or employs one or more features of, the communication program. Examples of said engagement actions may include, but are not limited to, terminating the communication program, specifying one or more communication targets, specifying a communication subject, and specifying a communication message. The organization user may interact with the communication program through other engagement actions not explicitly described hereinafter without departing from the scope disclosed herein.

In Step 306, based on the communication program engagement (monitored in Step 304), a determination is made as to whether any engagement action reflects a terminating of the communication program. The organization user may terminate the communication program by, for example, closing a user interface for, associated with, or representative of the communication program. As such, in one or many embodiment(s) disclosed herein, if it is determined that any engagement action terminates the communication program, then the method ends. On the other hand, in one or many other embodiment(s) disclosed herein, if it is alternatively determined that any engagement action does not terminate the communication program, then the method alternatively proceeds to Step 308.

In Step 308, following the determination (made in Step 306) that any engagement action, based on the communication program engagement (monitored in Step 304), does not terminate the communication program, a determination is made as to whether said any engagement action reflects a specifying of one or more communication targets (described below). As such, in one or many embodiment(s) disclosed herein, if it is determined that any engagement action specifies one or more communication targets, then the method proceeds to Step 310. On the other hand, in one or many other embodiment(s) disclosed herein, if it is alternatively determined that any engagement action does not specify one or more communication targets, then the method alternatively proceeds to Step 312.

In one or many embodiment(s) disclosed herein, a communication target may refer to an individual (e.g., another organization user (i.e., someone within the organization with which the organization user is affiliated) or a non-organization user (i.e., someone outside the organization with which the organization user is affiliated)) with whom the organization user may be communicating using the communication program. Further, the organization user may specify each communication target by, for example, selecting the communication target from a contact list or an address book managed by the communication program.

In Step 310, following the determination (made in Step 308) that any engagement action, based on the communication program engagement (monitored in Step 304), specifies one or more communication targets, a target user business intent is obtained for each communication target of the specified communication target(s). In one or many embodiment(s) disclosed herein, the target user business intent may refer to information, respective to a communication target, which may pertain to or describe the engagement of the communication target within and/or outside their organization (e.g., a commercial business, an education institute, etc.). The target user business intent, further, may be represented through a set of target business intent parameters. Examples of said target business intent parameter(s) (as they pertain to a communication target) may include, but is/are not limited to: one or more user organization roles (e.g., title(s) and/or position(s)) within an organization that may be associated with the communication target; one or more other users/individuals within the organization with which the communication target interacts and/or had interacted; one or more suppliers, distributors, customers, collaborators, and/or other actors outside the organization (also collectively referred to herein as one or more value networks) with which the communication target interacts and/or had interacted; a search query history reflecting one or more past search queries, as well as the search topic(s) entailed, which had been previously submitted by the communication target; one or more organization departments of the organization with which the communication target is associated; one or more organization responsibilities (e.g., assigned project(s) or task(s)) within the organization that the communication target is currently undertaking or had undertaken in the past; and one or more success metrics indicating a level of success that the aforementioned organization responsibility/responsibilities have brought to the organization. Said target business intent parameter(s) is/are not limited to the aforementioned specific examples.

From Step 310, the method proceeds to Step 304, where further engagement, by the organization user and with the communication program, is monitored.

In Step 312, following the alternative determination (made in Step 308) that any engagement action, based on the communication program engagement (monitored in Step 304), does not specify one or more communication targets, a determination is made as to whether said any engagement action reflects a specifying of a communication subject and/or a communication message (both described below). As such, in one or many embodiment(s) disclosed herein, if it is determined that any engagement action specifies the communication subject and/or the communication message, then the method proceeds to Step 314 (see e.g., FIG. 3B). On the other hand, in one or many other embodiment(s) disclosed herein, if it is alternatively determined that any engagement action does not specify the communication subject and/or the communication message, then the method alternatively proceeds to Step 304, where further engagement, by the organization user and with the communication program, is monitored.

In one or many embodiment(s) disclosed herein, a communication subject (if any) may refer to concise information (e.g., a single line of text) that captures a topic, or topics, concerning which the organization user wishes or intends to communicate to the communication target(s). A communication message, meanwhile, may refer to detailed information (e.g., one or more lines of text) that expands upon a topic, or topics, concerning which the organization user wishes or intends to communicate to the communication target(s). Further, though any communication program form provides the organization user with a means (e.g., a portion of a user interface) to compose and/or edit a communication message, not all communication forms provide said means to compose and/or edit a communication subject. For example, an email client may provide an email subject field and an email body field, via an email user interface, through which the organization user may enter and/or alter a communication subject and a communication message, respectively; however, an IM client may solely provide a message field, via an IM user interface, through which a communication message may be entered and/or altered by the organization user.

Turning to FIG. 3B, in Step 314, following the determination (made in Step 312) that any engagement action, based on the communication program engagement (monitored in Step 304), specifies a communication subject and/or a communication message, the specified communication subject and/or communication message is/are analyzed. In one or many embodiment(s) disclosed herein, the applied analysis, or analyses, may result in the identification of one or more communication keywords. A communication keyword may refer to a term/phrase or an expression that is deemed relevant to the specified communication subject and/or communication message. Further, any communication keyword may be identified, or deemed relevant, through any existing algorithms or techniques (e.g., natural language processing (NLP) based machine learning) directed to keyword detection, extraction, and/or analysis.

In Step 316, for each communication keyword (identified in Step 314), an asset catalog is filtered based on the communication keyword. In one or many embodiment(s) disclosed herein, the asset catalog may reference a collection of metadata pertaining to, and thus descriptive of, any number of assets known to the insight service. The asset catalog may also, or alternatively, be viewed as a data structure including any number of asset catalog entries, where each asset catalog entry corresponds to a known given asset and includes a subset of the collection of metadata particularly relevant to the known given asset. An asset, in turn, may refer to any form or format of data—i.e., structured (e.g., tabular data) or unstructured (e.g., text, multimedia, image, video, audio, or any combination thereof)— that resides or may be maintained on one or more internal and/or external data sources (see e.g., FIG. 1A).

Examples of said asset metadata may include, but is not limited to: a brief description of the asset; stewardship (or ownership) information (e.g., individual or group name(s), contact information, etc.) pertaining to the steward(s)/ owner(s) of the asset; a version character string reflective of a version or state of the asset at/for a given point-in-time; one or more categories, topics, and/or aspects associated with the asset; an asset identifier uniquely identifying the asset; one or more tags, keywords, or terms further describing the asset; a source identifier and/or location associated with an internal or external data source (see e.g., FIG. 1A) where the asset resides or is maintained; and compliance information specifying laws, regulations, and standards surrounding the asset, as well as policies directed to data governance (e.g., availability, usability, integrity, and security) pertinent to the asset. The asset metadata for any asset is not limited to the aforementioned specific examples.

Furthermore, in one or many embodiment(s) disclosed herein, filtering of the asset catalog may, for example, entail topic matching (e.g., case-insensitive word or phrase matching) and/or semantic similarity calculation between a given communication keyword and the asset metadata specified across the asset catalog entries representative of the known assets. Said filtering, moreover, may result in the identification of one or more asset catalog entries for, and thus relevant to, each communication keyword. Thereafter, the collective asset metadata across an aggregate, or superset, of all identified asset catalog entries (corresponding to the communication keyword(s)) may subsequently be examined/used to: retrieve the asset(s) (e.g. research papers, standards bodies, organization strategy cascades, conference summaries and presentations, etc.) (or at least portions thereof) respective to the aggregate, identified asset catalog entries; and additionally, or alternatively, produce/obtain one or more keyword-relevant insights (e.g., research and technology maps and/or ontologies, emerging research and technology trends or predictions, etc.).

In Step 318, one or more editing suggestions is/are generated. In one or many embodiment(s) disclosed herein, an editing suggestion may reference a proposed addition or alteration to the specified communication subject and/or communication message, which may serve to enhance the receptive value or appeal of the concise and/or detailed information, respectively, being conveyed to the communication target(s). Further, the editing suggestion(s) may be generated using any existing machine learning based suggestion (or recommendation) algorithm, where said algorithm may be configured to consume any subset or all of: the user business intent (obtained in Step 302), the target user business intent(s) (obtained in Step 310), and the collective asset metadata as well as the keyword-relevant insight(s) (obtained in Step 316), to produce the editing suggestion(s).

In Step 320, the editing suggestion(s) (generated in Step 318) is/are provided to the organization user. In one or many embodiment(s) disclosed herein, the editing suggestion(s) may each be conveyed to the organization user through the user interface of the communication program (and, more specifically, embedded within, proximal to, or overlapping field(s) of the user interface directed to the communication subject and/or communication message), where said conveyance may be facilitated by the insight agent(s) executing on the client device (operated by the organization user) and associated with the communication program. Further, concerning presentation, the editing suggestion(s) may each be revealed, for example, as a comment, an annotation, a placeholder text, or any other markup feature capable of providing the editing suggestion(s) to the organization user through the user interface of the communication program.

In Step 322, an adoption or ignorance of the editing suggestion(s) (provided in Step 320), by the organization user, is detected. In one or many embodiment(s) disclosed herein, the organization user may opt to adopt/accept any subset or all of the provided editing suggestion(s). Additionally, or alternatively, the organization user may opt to ignore/discard any subset or all of the provided editing suggestion(s). In order to adopt any given editing suggestion, the organization user may, for example, interact with the user interface of the communication program to: select the given editing suggestion, which may lead to the presentation of a dialog box prompting the organization user to opt between adopting or ignoring the given editing suggestion; and, subsequently, obtaining, and thus detecting, a selection by the organization user, and in response to the prompt via the dialog box, to adopt the given editing suggestion. Conversely, in order to ignore any given editing suggestion, the organization user may, for example, interact with the user interface of the communication program to: select the given editing selection, which may lead to the presentation of a dialog box prompting the organization user to opt between adopting or ignoring the given editing suggestion; and, subsequently, obtaining, and thus detecting, a selection by the organization user, and in response to prompt via the dialog box, to alternatively ignore the given editing suggestion.

In Step 324, a determination is made as to whether all of the editing suggestion(s) (provided in Step 320) had been ignored by the organization user. In one or many embodiment( ) disclosed herein, if it is determined that the editing suggestion(s) had been ignored, then the method proceeds to Step 326. On the other hand, in one or many other embodiment(s) disclosed herein, if it is alternatively determined that at least one editing suggestion had been adopted by the organization user, then the method alternatively proceeds to Step 328.

In Step 326, following the determination (made in Step 324) that all of the editing suggestion(s) (provided in Step 320) had been ignored by the organization user, the suggestion algorithm (mentioned in Step 318) is adjusted. In one or many embodiment(s) disclosed herein, adjustment of the algorithm may, for example, entail the tuning or refinement of any machine learning model parameters and/or hyper-parameters (e.g., configuration variables defining a structure and governing a behavior) of a machine learning model representative of the suggestion algorithm.

From Step 326, the method proceeds to Step 304, where further engagement, by the organization user and with the communication program, is monitored.

In Step 328, following the alternative determination (made in Step 324) that at least one editing suggestion (provided in Step 320) had been adopted by the organization user, a response from each communication target, of the specified communication target(s), is tracked. In one or many embodiment(s) disclosed herein, any given response: may pertain to an enhanced communication message that may have been sent, by the organization user, to the communication target(s); and, further, may reflect either a positive reaction or negative reaction by a given communication target. The enhanced communication message may refer to a communication message that has been supplemented with at least one adopted editing suggestion. Meanwhile, a response reflective of a positive reaction may be indicated, for example, through a follow-up communication message composed by a communication target and directed back to the organization user. On the other hand, a response reflective of a negative reaction may alternatively be indicated, for example, through an ignorance or a disregard of the enhanced communication message received by a communication target.

In Step 330, based on the respective response(s) from the communication target(s) (tracked in Step 328), the suggestion algorithm (mentioned in Step 318) may or may not be adjusted. That is, in one or many embodiment(s) disclosed herein, if at least one response, of the response(s) (tracked in Step 328), is reflective of a negative reaction (described above), then the suggestion algorithm may be adjusted. Further, adjustment of the suggestion algorithm may be substantially similar to the example procedure described in Step 326, above. On the other hand, in one or many other embodiment(s) disclosed herein, if each of the response(s) (tracked in Step 328) is/are reflective of a positive reaction (described above), then the suggestion algorithm may not need adjustment.

From Step 330, the method proceeds to Step 304, where further engagement, by the organization user and with the communication program, is monitored.

Figure 4:
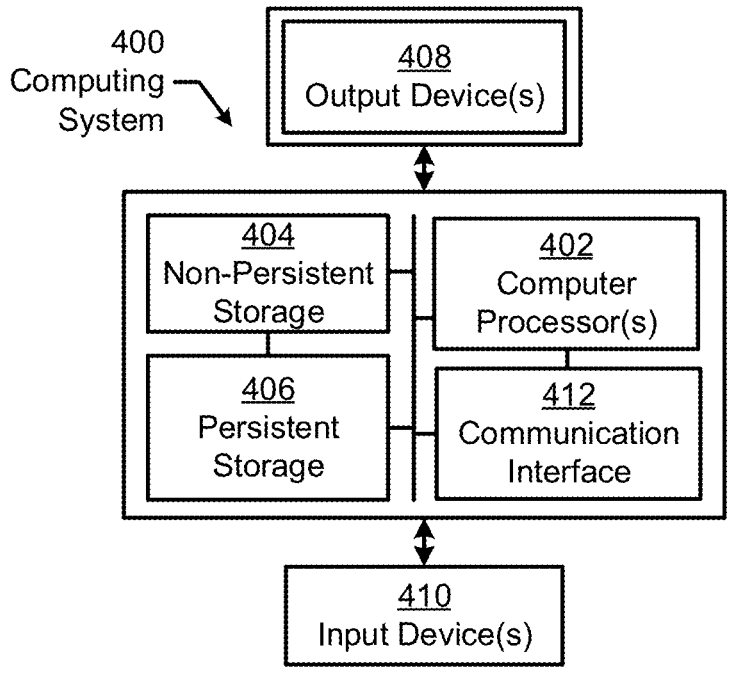
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infra-red interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
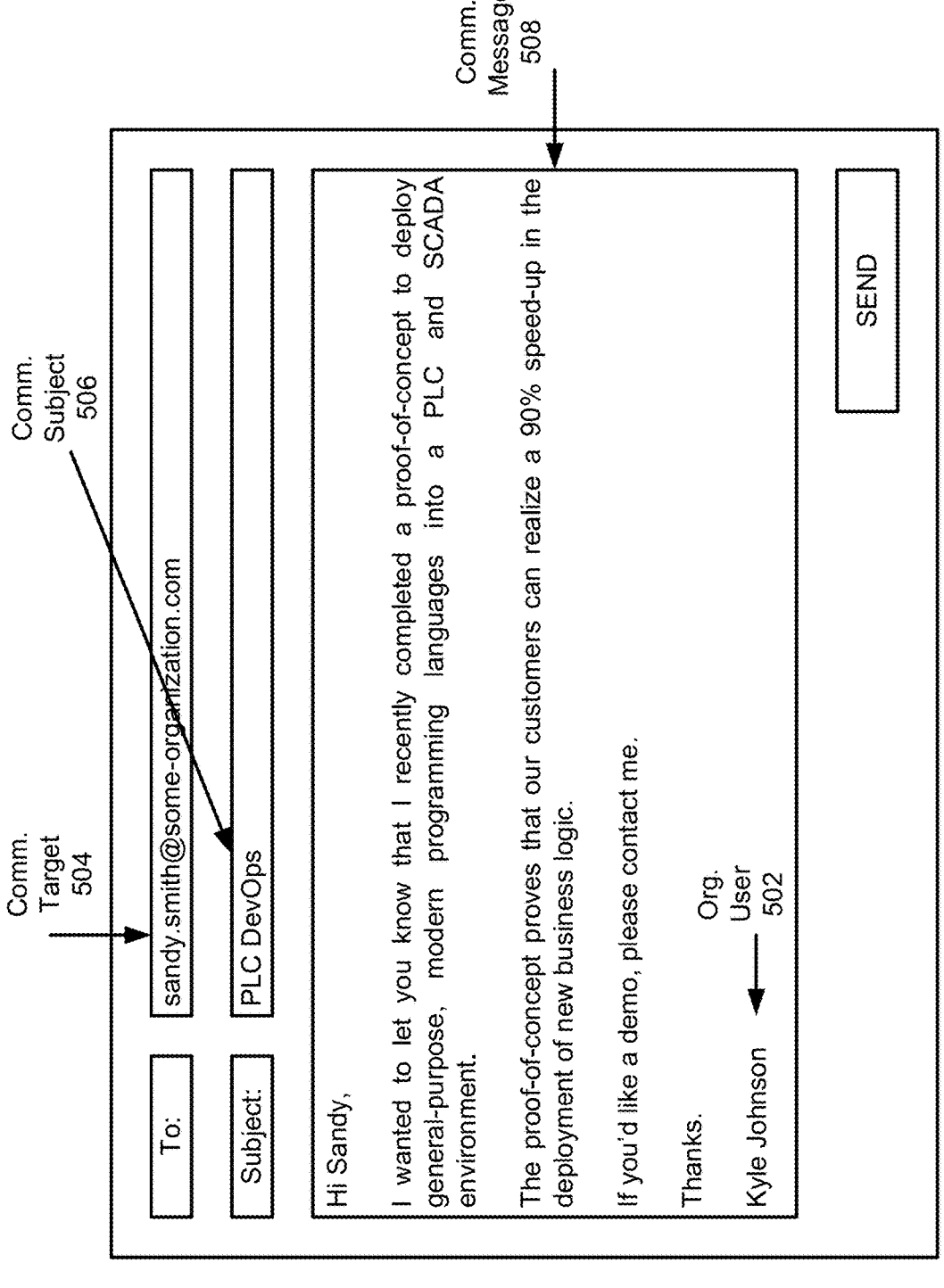
FIGS. 5A and 5B show an example scenario in accordance with one or more embodiments disclosed herein.
Figure 5B:
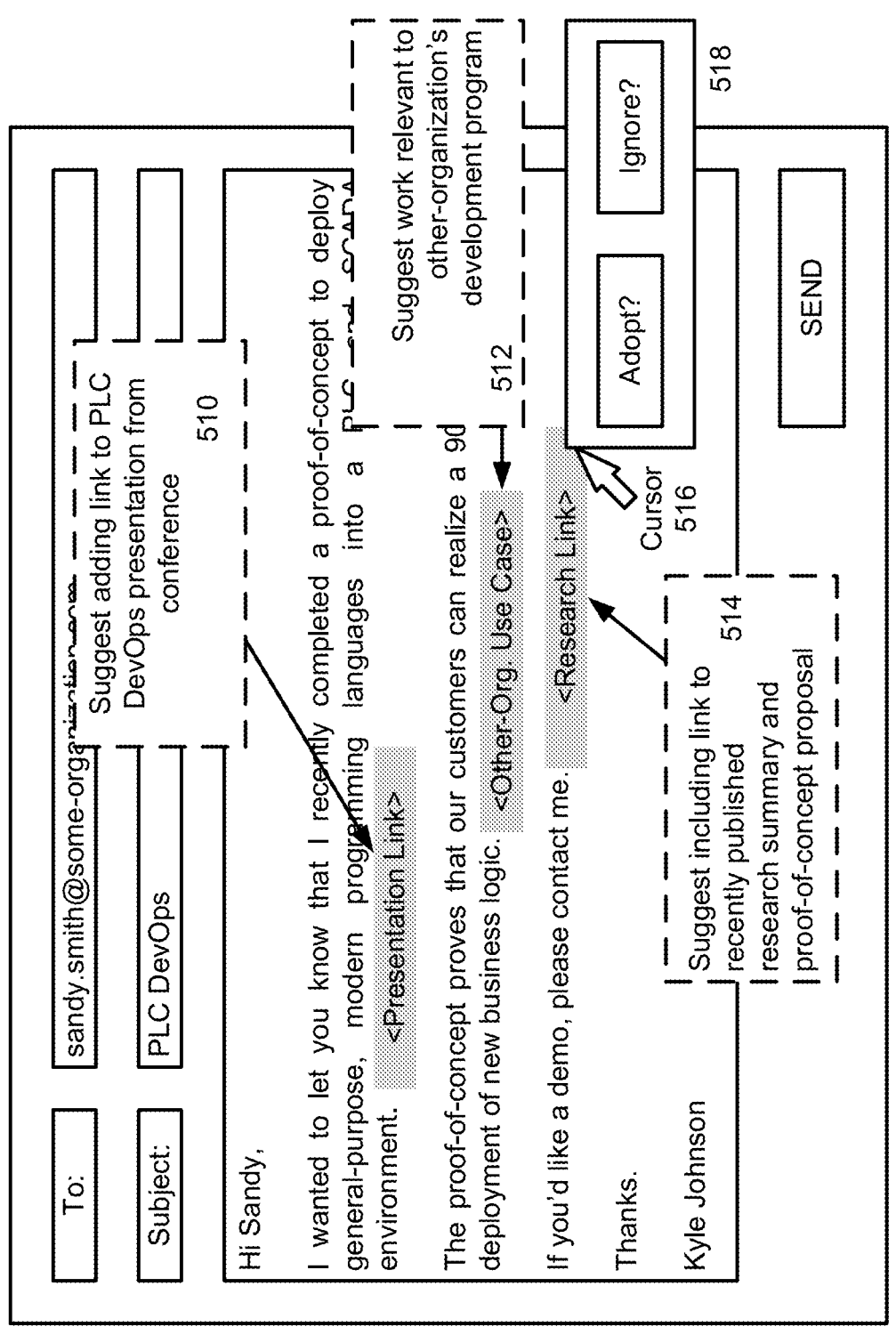

FIGS. 5A and 5B show an example scenario in accordance with one or more embodiments disclosed herein. The example scenario, illustrated through FIGS. 5A and 5B and described below, is for explanatory purposes only and not intended to limit the scope disclosed herein.

Hereinafter, consider the following example scenario whereby an organization user, identified as Kyle Johnson, seeks to compose an email to another organization user identified as Sandy Smith. To that end, Kyle initiates his preferred email client (e.g., communication program) on his laptop computer (e.g., client device)—the initiation of the former of which is detected by the Insight Service via an Insight Agent executing on the laptop computer and associated with the email client. Moreover, based on certain subsequent interactions (or engagement actions) by Kyle and applied to the email client (or features thereof), the Insight Service may follow embodiments disclosed herein pertaining to business intent based communications enhancement as applied to the circumstances of the example scenario.

Based on a user ID and/or credentials assigned to Kyle, the Insight Service subsequently obtains a user business intent associated with him, where the obtained user business intent specifies that Kyle: (a) is a firmware developer in an edge business unit of the organization with which Sandy and he are both affiliated; (b) has published internal research papers on how to deploy general purpose software languages in a supervisory control and data acquisition (SCADA)/ programmable logic controller (PLC) environment; and (c) is conducting an open innovation project with a multinational conglomerate technology company.

Following initiation of his preferred email client, Kyle (e.g., organization user) (502 @ FIG. 5A) proceeds to draft or compose a new email (500 @ FIG. 5A). In an addressee field of the new email, Kyle enters an email address belonging to Sandy (e.g., communication target) (504 @ FIG. 5A).

Based on said email address belonging to Sandy, the Insight Service obtains a target user business intent associated with her, where the obtained target user business intent specifies that Sandy: (a) is a technical marketer in the edge business unit of the organization with which Kyle and she are both affiliated; (b) regularly attends LF Edge standards meeting—LF Edge being an umbrella organization aiming to establish an open, interoperable framework for edge computing independent of hardware, silicon, the cloud, or operating systems; (c) typically searches for documents related to secure device onboarding and zero-trust security; and (d) has presented to companies that are involved in industrial Internet of Things (IoT) use cases and that struggle with opening up SCADA/PLC operational technology (OT) configurations to information technology (IT) processes.

After populating the addressee field, Kyle moves to provide a single-line of text (e.g., "PLC DevOps"), denoting the topic of the email to Sandy, into the email subject line (e.g., communication subject) (506 @ FIG. 5A) of said email.

The Insight Service analyzes the email subject line and identifies "PLC" and "DevOps" as communication keywords. An asset catalog is subsequently filtered using the identified keywords to fetch information (e.g., one or more assets, and/or one or more keyword-relevant insights) respective to the email subject line. Said fetched information may summarily reflect a current state, and/or predictions as to the future evolution, of the technology area surrounding combined software development (Dev) and IT operations (Ops) practices in the PLC space.

Kyle, thereafter, proceeds to compose the email body (e.g., communication message) (508 @ FIG. 5A) of the email. The email body states the following text: "Hi Sandy, I wanted to let you know that I recently completed a proof-of-concept to deploy general-purpose, modern programming languages into a PLC and SCADA environment. The proof-of-concept proves that our customers can realize a 90% speed-up in the deployment of new business logic. If you'd like a demo, please contact me. Thanks. Kyle Johnson" (also, see e.g., FIG. 5A).

From here, the Insight Service analyzes the email body and identifies additional communication keywords, which are used to further filter the asset catalog to fetch additional information (e.g., one or more additional assets, and/or one or more additional keyword-relevant insights) respective to the email body. Said fetched additional information may also summarily reflect a current state, and/or predictions as to the future evolution, of the technology area surrounding combined software development (Dev) and IT operations (Ops) practices in the PLC space.

The Insight Service, furthermore, leverages the obtained user business intent for Kyle, the obtained target user business intent for Sandy, and the fetched information from analyzing the email subject line and body, to generate a few editing suggestions. Said editing suggestions include: (a) the inclusion of a link (510 @ FIG. 5B) to a PLC DevOps presentation that Kyle had created for a recent technology conference; (b) the citation (512 @ FIG. 5B) for a use case relevant to a development program spearheaded by another organization, the other organization being the multinational conglomerate technology company with which Kyle is conducting an open innovation project; and (c) the inclusion of a link (514 @ FIG. 5B) to a research summary and a proof-of-concept proposal that had been recently published by Kyle. These editing suggestions may be presented to Kyle, via his preferred email client, as exemplified in FIG. 5B.

For each presented editing suggestion (510, 512, 514 @ FIG. 5B), Kyle may hover over or select the editing suggestion via a cursor (516 @ FIG. 5B). In engaging with each presented editing suggestion, a dialog box (518 @ FIG. 5B) appears prompting Kyle to choose whether to adopt or ignore the selected editing suggestion. From here, based on Kyle's adoption or ignorance of any of the presented editing suggestions, as well as based on Sandy's response to the email (if Kyle ignores the editing suggestions) or the enhanced email (if Kyle adopts at least one editing suggestion), the Insight Service may or may not make adjustments to its suggestion algorithm.

While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for enhancing communications, the method comprising:

detecting an initiation, by an organization user, of a communication program executing on a client device based on on-demand telemetry received from the client device that is being used by the organization user;

obtaining a user business intent for the organization user;

monitoring interactions, by the organization user, with the communication program to identify an engagement action, wherein the engagement action reflects a composing of a communication message, wherein monitoring the interactions, by the organization user, with the communication program further identifies a second engagement action, wherein the second engagement action reflects a specifying of a communication target;

making, based on the engagement action, a determination that the engagement action does not terminate the communication program;

analyzing, after the determination, the communication message to identify at least one communication keyword;

filtering, based on the at least one communication keyword, an asset catalog to obtain keyword-relevant information;

generating, to enhance the communication message and based on the determination, a set of editing suggestions based at least on the user business intent, the keyword-relevant information, and a suggestion algorithm, wherein the set of editing suggestions enhances the communication message; and providing, through the communication program, the set of editing suggestions to the organization user;

after providing the set of editing suggestions to the organization user:

detecting an adoption, by the organization user, of at least one editing suggestion in the set of editing suggestions, wherein the organization user forwards, to the communication target, an enhanced communication message comprising the adoption of the at least one editing suggestion as applied to the communication message;

tracking a response, by the communication target, to the enhanced communication message, wherein the response reflects a positive reaction by the communication target; and retaining, based on the response, the suggestion algorithm.

2. The method of claim 1, wherein the user business intent comprises an organization role within an organization with which the organization user is affiliated, at least one other organization user of the organization with which the organization user interacts, at least one value network outside the organization with which the organization user interacts, a search query history associated with the organization user, and at least one organization responsibility that the organization user is undertaking.

3. The method of claim 1, wherein the at least one communication keyword pertains to a technology area.

4. The method of claim 3, wherein the keyword-relevant information comprises metadata describing at least one asset relevant to the technology area.

5. The method of claim 4, wherein the keyword-relevant information further comprises insights into a current state of the technology area and predictions for a future evolution of the technology area.

6. The method of claim 1, wherein the communication message is addressed to the communication target, wherein the communication target is a second organization user.

7. The method of claim 1, the method further comprising:

prior to generating the set of editing suggestions:

obtaining a target user business intent for the communication target, wherein the set of editing suggestions is generated further based on the target user business intent.

8. The method of claim 1, wherein monitoring the interactions, by the organization user, with the communication program further identifies a second engagement action, wherein the second engagement action reflects a specifying of a communication subject.

9. The method of claim 8, the method further comprising:

prior to generating the set of editing suggestions:

analyzing the communication subject to identify at least one communication keyword; and filtering, based on the at least one communication keyword, an asset catalog to obtain keyword-relevant information, wherein the set of editing suggestions is generated further based on the keyword- relevant information.

10. A non-transitory computer readable medium (CRM) comprising computer readable program code, which when executed by a computer processor, enables the computer processor to perform a method for enhancing communications, the method comprising:

detecting an initiation, by an organization user, of a communication program executing on a client device based on on-demand telemetry received from the client device that is being used by the organization user;

obtaining a user business intent for the organization user;

monitoring interactions, by the organization user, with the communication program to identify an engagement action, wherein the engagement action reflects a composing of a communication message, wherein monitoring the interactions, by the organization user, with the communication program further identifies a second engagement action, wherein the second engagement action reflects a specifying of a communication target;

making, based on the engagement action, a determination that the engagement action does not terminate the communication program;

analyzing, after the determination, the communication message to identify at least one communication keyword;

filtering, based on the at least one communication keyword, an asset catalog to obtain keyword-relevant information;

generating, to enhance the communication message and based on the determination, a set of editing suggestions based at least on the user business intent, the keyword-relevant information, and a suggestion algorithm, wherein the set of editing suggestions enhances the communication message; and providing, through the communication program, the set of editing suggestions to the organization user;

after providing the set of editing suggestions to the organization user:

detecting an adoption, by the organization user, of at least one editing suggestion in the set of editing suggestions, wherein the organization user forwards, to the communication target, an enhanced communication message comprising the adoption of the at least one editing suggestion as applied to the communication message;

tracking a response, by the communication target, to the enhanced communication message, wherein the response reflects a positive reaction by the communication target; and retaining, based on the response, the suggestion algorithm.

11. The non-transitory CRM of claim 10, wherein the at least one communication keyword pertains to a technology area.

12. The non-transitory CRM of claim 11, wherein the keyword-relevant information comprises metadata describing at least one asset relevant to the technology area.

13. The non-transitory CRM of claim 12, wherein the keyword-relevant information further comprises insights into a current state of the technology area and predictions for a future evolution of the technology area.

14. The non-transitory CRM of claim 10, the method further comprising:

prior to generating the set of editing suggestions:

obtaining a target user business intent for the communication target, wherein the set of editing suggestions is generated further based on the target user business intent.

15. A system, the system comprising:

a client device; and an insight service operatively connected to the client device, and comprising a computer processor configured to perform a method for enhancing communications, the method comprising:

detecting an initiation, by an organization user operating the client device, of a communication program executing on the client device based on on-demand telemetry received from the client device;

obtaining a user business intent for the organization user;

monitoring interactions, by the organization user, with the communication program to identify an engagement action, wherein the engagement action reflects a composing of a communication message, wherein monitoring the interactions, by the organization user, with the communication program further identifies a second engagement action, wherein the second engagement action reflects a specifying of a communication target;

making, based on the engagement action, a determination that the engagement action does not terminate the communication program;

analyzing, after the determination, the communication message to identify at least one communication keyword;

filtering, based on the at least one communication keyword, an asset catalog to obtain keyword-relevant information;

generating, to enhance the communication message and based on the determination, a set of editing suggestions based at least on the user business intent the keyword-relevant information, and a suggestion algorithm, wherein the set of editing suggestions enhances the communication message; and providing, through the communication program, the set of editing suggestions to the organization user;

after providing the set of editing suggestions to the organization user:

detecting an adoption, by the organization user, of at least one editing suggestion in the set of editing suggestions, wherein the organization user forwards, to the communication target, an enhanced communication message comprising the adoption of the at least one editing suggestion as applied to the communication message;

tracking a response, by the communication target, to the enhanced communication message, wherein the response reflects a positive reaction by the communication target; and retaining, based on the response, the suggestion algorithm.

\* \* \* \* \*